(12) United States Patent
Aparin (10) Patent No.: US 8,774,314 B2
(45) Date of Patent: Jul. 8, 2014

(54) TRANSMITTER ARCHITECTURES

(75) Inventor: Vladimir Aparin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 383 days.

(21) Appl. No.: 12/490,264

(22) Filed: Jun. 23, 2009

(65) Prior Publication Data

US 2010/0322346 A1 Dec. 23, 2010

(51) Int. Cl.
*H04L 25/03* (2006.01)

(52) U.S. Cl.
USPC .................................. 375/297; 455/114.3

(58) Field of Classification Search
USPC .................. 375/297, 296, 285, 284; 455/63.1, 455/114.3; 330/149
See application file for complete search history.

(56) References Cited

U.S. PATENT DOCUMENTS

| | | | |
|---|---|---|---|
| 4,006,351 A * | 2/1977 | Constant ........................ | 708/314 |
| 4,532,639 A * | 7/1985 | Price et al. ..................... | 375/343 |
| 4,742,532 A | 5/1988 | Walker | |
| 5,710,521 A | 1/1998 | Butler | |
| 5,841,388 A | 11/1998 | Yasuda et al. | |
| 5,898,665 A * | 4/1999 | Sawahashi et al. ........... | 370/342 |
| 5,959,499 A | 9/1999 | Khan et al. | |
| 5,995,567 A | 11/1999 | Cioffi et al. | |
| 6,400,233 B1 | 6/2002 | Thomas | |
| 6,625,436 B1 | 9/2003 | Tolson et al. | |
| 6,745,003 B1 | 6/2004 | Maca et al. | |
| 7,062,233 B2 | 6/2006 | Huttunen | |
| 7,483,685 B2 | 1/2009 | Lewis | |
| 7,711,329 B2 | 5/2010 | Aparin et al. | |
| 7,761,063 B2 | 7/2010 | Tsuda et al. | |
| 7,965,134 B2 | 6/2011 | Aparin et al. | |
| 2001/0038666 A1* | 11/2001 | Mesecher et al. ............. | 375/148 |
| 2002/0041208 A1* | 4/2002 | Hamada et al. ............... | 330/149 |
| 2002/0072344 A1 | 6/2002 | Souissi | |
| 2002/0080891 A1 | 6/2002 | Ahn et al. | |
| 2002/0136324 A1 | 9/2002 | Nagasaka | |
| 2003/0031271 A1 | 2/2003 | Bozeki et al. | |
| 2003/0125065 A1 | 7/2003 | Barak et al. | |
| 2004/0109512 A1 | 6/2004 | Fonden et al. | |
| 2004/0142667 A1 | 7/2004 | Lochhead et al. | |

(Continued)

FOREIGN PATENT DOCUMENTS

| | | |
|---|---|---|
| CN | 1211944 C | 7/2005 |
| CN | 1663131 A | 8/2005 |

(Continued)

OTHER PUBLICATIONS

International Search Report and Written Opinion—PCT/US2010/039612, International Search Authority—European Patent Office—Sep. 17, 2010.

(Continued)

*Primary Examiner* — Aristocratis Fotakis
(74) *Attorney, Agent, or Firm* — Ramin Mobarhan (57) ABSTRACT

Techniques for generating a transmit (TX) signal with improved characteristics in the presence of interference such as noise and distortion. In one aspect, the TX output signal is used to generate a reconstructed signal having the characteristics of the interference, and the reconstructed signal is subtracted from the baseband TX signal. The reconstructed signal may be generated by high-pass filtering the TX output signal at baseband. Alternatively, the reconstructed signal may be generated from a reference signal Ref derived from the baseband TX signal.

23 Claims, 11 Drawing Sheets

(56) References Cited

U.S. PATENT DOCUMENTS

| | | |
|---|---|---|
| 2004/0166813 A1 | 8/2004 | Mann et al. |
| 2004/0237007 A1 | 11/2004 | Busking |
| 2005/0047521 A1 | 3/2005 | Ishikawa et al. |
| 2005/0073361 A1 | 4/2005 | Hamada et al. |
| 2005/0124375 A1 | 6/2005 | Nowosielski |
| 2005/0180527 A1* | 8/2005 | Suzuki et al. ............... 375/297 |
| 2005/0253745 A1 | 11/2005 | Song et al. |
| 2006/0050810 A1 | 3/2006 | Haque et al. |
| 2006/0105715 A1* | 5/2006 | Kodani et al. ............... 455/63.1 |
| 2006/0281419 A1 | 12/2006 | Peplinski et al. |
| 2007/0069813 A1 | 3/2007 | Li et al. |
| 2007/0184782 A1 | 8/2007 | Sahota et al. |
| 2008/0171522 A1* | 7/2008 | Ben-Ayun et al. ............ 455/126 |
| 2008/0233894 A1 | 9/2008 | Aparin |
| 2009/0036082 A1 | 2/2009 | Sajid et al. |
| 2009/0042521 A1 | 2/2009 | Otaka et al. |
| 2009/0213770 A1 | 8/2009 | Mu |
| 2009/0221245 A1* | 9/2009 | Gonikberg et al. ......... 455/114.3 |
| 2009/0264089 A1 | 10/2009 | Suzuki et al. |
| 2010/0022206 A1* | 1/2010 | Aparin et al. ............... 455/114.2 |
| 2010/0048149 A1* | 2/2010 | Tang et al. .................. 455/114.3 |
| 2010/0109771 A1* | 5/2010 | Baik et al. ..................... 330/149 |
| 2010/0167639 A1 | 7/2010 | Ranson et al. |
| 2010/0201442 A1* | 8/2010 | Akaiwa .......................... 330/149 |
| 2010/0327932 A1 | 12/2010 | Aparin et al. |
| 2011/0143697 A1 | 6/2011 | Verma et al. |
| 2011/0158346 A1 | 6/2011 | Ballantyne |

FOREIGN PATENT DOCUMENTS

| | | |
|---|---|---|
| CN | 101267218 A | 9/2008 |
| EP | 1531553 | 5/2005 |
| EP | 1657814 A1 | 5/2006 |
| EP | 2019486 | 1/2009 |
| JP | 08088577 | 4/1996 |
| JP | 2000115009 A | 4/2000 |
| JP | 2000509577 A | 7/2000 |
| JP | 2001060903 A | 3/2001 |
| JP | 2006140785 A | 6/2006 |
| JP | 2007174252 A | 7/2007 |
| JP | 2008017218 A | 1/2008 |
| WO | 9740587 A1 | 10/1997 |
| WO | WO-03103166 A1 | 12/2003 |
| WO | WO2005053152 | 6/2005 |
| WO | 2006068635 | 6/2006 |
| WO | WO-2008004916 A1 | 1/2008 |
| WO | WO-2008048534 A1 | 4/2008 |
| WO | WO2008094259 A1 | 8/2008 |
| WO | WO2008118898 | 10/2008 |
| WO | WO2010011977 | 1/2010 |

OTHER PUBLICATIONS

Mizusawa N et al: "Third- and fifth-order baseband component injection for linearization of the power amplifier in a cellular phone", IEEE Transactions on Microwave Theory and Techniques, IEEE Service Center, Piscataway, NJ, US, vol. 53, No. 11, Nov. 1, 2005, pp. 3327-3334, XP001512580, ISSN: 0018-9480, DOI: DOI:10.1109/TMTT.2005.855747.

Razavi, "A 900-MHz/1.8-GHz CMOS transmitter for dual-band applications," IEEE Journal of Solid-State Circuits, May 1999, vol. 34, No. 5, pp. 573-579.

Razavi, "Architectures and circuits for RF CMOS receivers," IEEE 1998 Custom Integrated Circuits Conference, May 1998, pp. 393-400.

Rudell, et al., "A 1.9-GHz Wide-Band IF Double Conversion CMOS Receiver for Cordless Telephone Application" IEEE Journal of Solid-State Circuits, IEEE Service Center, Piscataway, NJ, US, vol. 32, No. 12, Dec. 1, 1997, pp. 2071-2088, XP011060631.

* cited by examiner (PRIOR ART)
FIG 1

TRANSMITTER ARCHITECTURES

BACKGROUND

1. Field

The present disclosure relates generally to communications transmitters, and more specifically, to techniques for improving the quality of signals generated by communications transmitters.

2. Background

In a communications system, a transmitter processes information to generate a modulated transmit (TX) signal, and transmits the modulated signal via a communication channel to a receiver. At the transmitter, the generated TX signal may be corrupted by interference, e.g., by noise generated in the transmitter circuitry, or by distortion resulting from component non-linearity. Prior art techniques for mitigating such interference include increasing the transmitter's power consumption, and/or introducing complex TX pre-processing schemes that call for expensive factory calibration.

It would be desirable to provide simple and power-efficient techniques to improve the quality of TX signals generated by the transmitter in the presence of interference.

DETAILED DESCRIPTION

The detailed description set forth below in connection with the appended drawings is intended as a description of exemplary embodiments of the present invention and is not intended to represent the only exemplary embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

Figure 1:
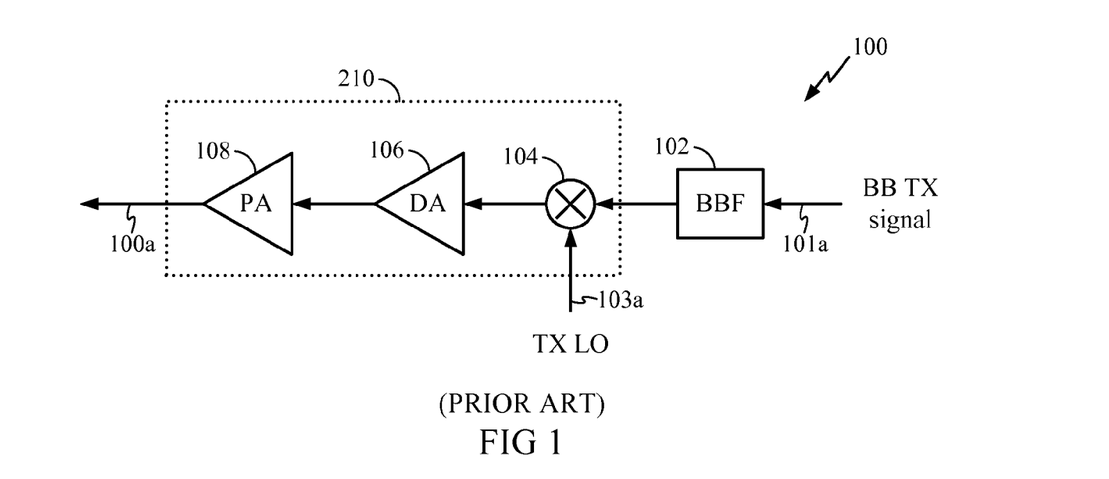
FIG. 1 illustrates a simplified signal processing chain for a prior art transmitter.

FIG. 1 illustrates a simplified signal processing chain for a prior art transmitter 100. Note one of ordinary skill in the art will appreciate that certain details have been omitted from the transmitter 100 for ease of discussion. In FIG. 1, a baseband (BB) TX signal 101a is input to a baseband filter (BBF) 102. The output of BBF 102 is coupled to a mixer 104, which performs mixing with a TX local oscillator (TX LO) 103a. The TX LO 103a may be, e.g., a radio-frequency (RF) carrier signal. In that case, the mixer 104 may be understood as performing an up-conversion operation, whereby the filtered TX BB signal 101a is translated upwards in frequency from baseband to RF. The output of mixer 104 is coupled to a driver amplifier (DA) 106, which in turn drives a power amplifier (PA) 108. DA 106 and PA 108 may provide gain to the TX signal prior to external transmission, e.g., over the air via an antenna (not shown), as TX output signal 100a. The combination of the mixer 104, DA 106, and PA 108 is also denoted herein as the feed-forward path 210. One of ordinary skill in the art will appreciate that a feed-forward path 210 may generally include other elements not shown, such as filters, gain elements, etc.

Figure 1A:
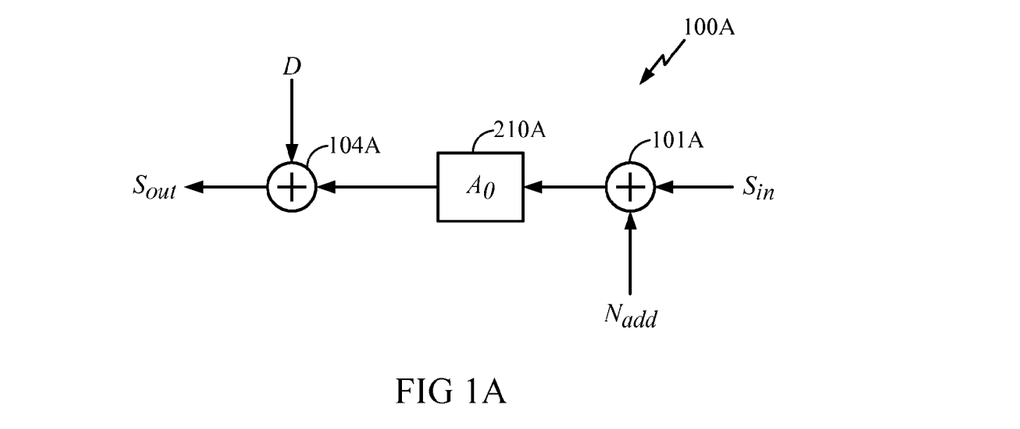
FIG. 1A illustrates a conceptualized block diagram more clearly showing the effects of noise and distortion on the transmitter.

It will be appreciated the TX output signal 100a may contain undesired interference such as distortion, noise and spurious responses. FIG. 1A illustrates a conceptualized block diagram 100A more clearly showing the effects of noise and distortion on the transmitter 100. The transmitter represented by block diagram 100A may be referred to as an "open-loop" transmitter, to distinguish it from "closed-loop" transmitters to be further discussed hereinbelow that utilize feedback to improve TX signal quality.

In FIG. 1A, the desired signal $S_{in}$, which may correspond to the input signal 101a in FIG. 1, is combined with additive noise $N_{add}$ by adder 101A. The output of adder 101A is input to a gain element 210A, which applies a gain $A_0$ to its input. For example, the gain element 210A may model the gain of the feed-forward path 210 in FIG. 1. The output of the gain element 210A is combined with a distortion component D by adder 104A. The output signal of the transmitter is denoted as $S_{out}$, which may correspond to the output signal 100a in FIG. 1.

One of ordinary skill in the art will appreciate that adders 101A and 104A may be understood to model any mechanism for introducing noise and/or distortion into the TX signal, and need not correspond to any system block specifically designed to perform addition.

Given the above description, one of ordinary skill in the art will appreciate that the system 100A may be characterized as follows:

$$S_{out} = A_0 \cdot (N_{add} + S_{in}) + D. \quad \text{(Equation 1)}$$

To mitigate the effects of the noise $N_{add}$ and distortion D described above, conventional techniques may resort to designing the transmitter blocks to have high linearity and low noise. This generally calls for higher power consumption and/or greater design complexity.

Figure 2:
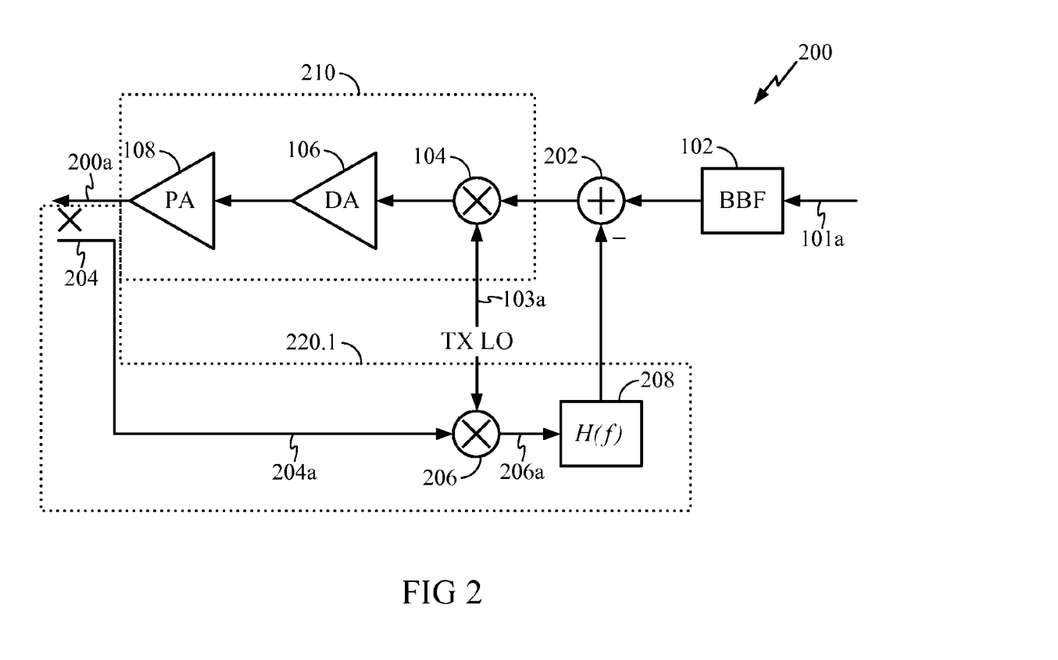
FIG. 2 illustrates an exemplary embodiment of a transmitter according to the present disclosure.

FIG. 2 illustrates an exemplary embodiment 200 of a transmitter according to the present disclosure. Note similarly labeled elements in FIGS. 1 and 2 may generally perform similar functions, unless otherwise noted.

In FIG. 2, the transmitter 200 includes a feed-forward path 210 and a feedback path 220.1 with elements as shown. The transmitter 200 generates a TX output signal 200a. The TX output signal 200a is coupled via an RF coupler 204 to the input of a mixer 206 as signal 204a. In an exemplary embodiment, the RF coupler 204 may be a transmission line coupler that couples a portion of the signal 200a to the signal 204a. The mixer 206 mixes the signal 204a with a version of the same TX LO 103a used by up-conversion mixer 104. The mixer 206 may be understood as performing a down-conversion operation, whereby the signal 204a is translated downwards in frequency from RF to baseband to generate a signal 206a, also denoted herein as a "feedback signal." In an exemplary embodiment, a low-pass filter (LPF) (not shown) may be provided to filter signal 206a to reject high-frequency mixing products from 206 and/or to improve stability margins.

The signal 206a is input to a filter 208 characterized by a frequency response H(f). The output of filter 208 is subtracted from the output of BBF 102 using adder 202. As will be clear in light of the description hereinbelow, by selecting the frequency response H(f) of the filter 208, and/or choosing the net gain applied by the feed-forward path 210 and feedback path 220.1, the noise and/or distortion present in the TX signal output 200a may advantageously be reduced.

Figure 2A:
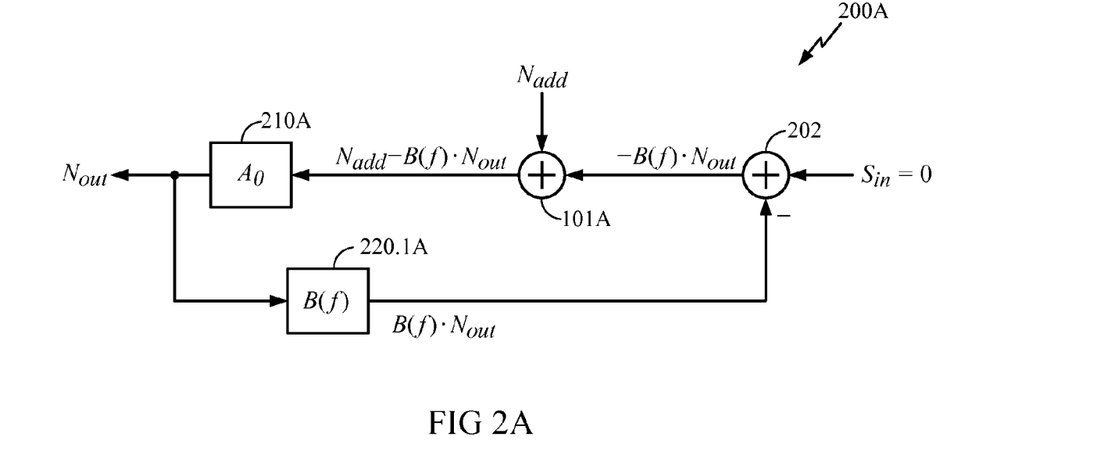
FIG. 2A illustrates a conceptualized block diagram of the effects of the processing performed by the transmitter of FIG. 2 on certain noise sources present in the system.

FIG. 2A illustrates a conceptualized block diagram 200A more clearly showing the effects of the processing performed by the transmitter 200 on certain noise sources present in the system. In FIG. 2A, the signals and transfer functions shown are represented in the frequency domain. Note the description of FIG. 2A follows the description of similarly labeled elements in the block diagram 100A of FIG. 1A, with the signal term $S_{in}$ set to zero, and the distortion term D omitted for ease of discussion.

In FIG. 2A, the signal present at the output of the block diagram 200A is denoted as $N_{out}$. For example, $N_{out}$ may correspond to the signal 200a present at the output of the feed-forward path 210 in FIG. 2, when the signal input 101a is set to zero, and when the transmitter components introduce no distortion D. $N_{out}$ is coupled to the feedback element 220.1A, ideally characterized by a frequency response B(f), to generate the signal $B(f) \cdot N_{out}$. The feedback element 220.1A may model the net effects of the feedback path 220.1 in FIG. 2. $B(f) \cdot N_{out}$ is coupled to the adder 202, which subtracts $B(f) \cdot N_{out}$ from the input signal $S_{in}$. $S_{in}$.

As $S_{in}$ is assumed to be zero, the output of adder 202 may be represented as $B(f) \cdot N_{out}$. $B(f) \cdot N_{out}$ is further combined with a noise source $N_{add}$ by adder 101A. The output of adder 101A may be represented as $N_{add} - B(f) \cdot N_{out}$, and is subsequently input to the gain element 210A, which applies a gain $A_0$ to generate the signal $N_{out}$.

Given the above description, one of ordinary skill in the art will appreciate that the system 200A may be characterized as follows:

$$N_{out} = \frac{A_0 N_{add}}{1 + A_0 B(f)}. \quad \text{(Equation 2)}$$

Figure 2B:
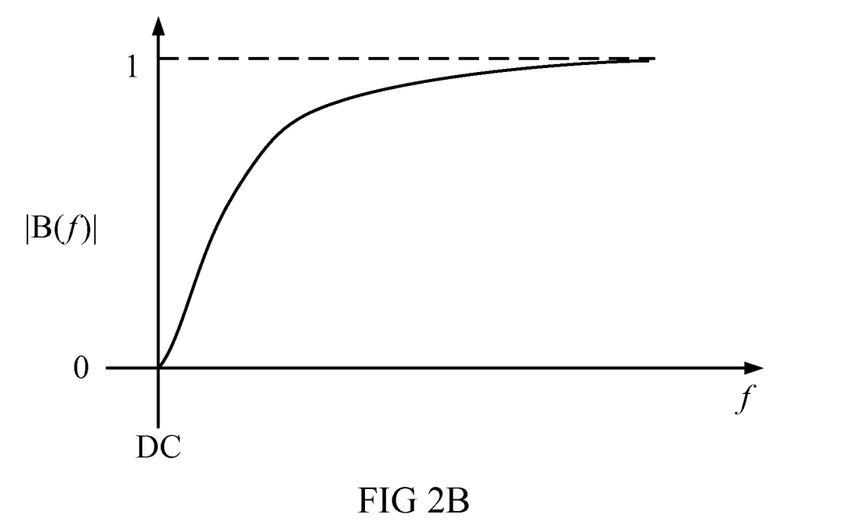
FIG. 2B illustrates an exemplary frequency response B(f) of a feedback path in the transmitter of FIG. 2, wherein B(f) is chosen to have a generally high-pass characteristic.

FIG. 2B illustrates an exemplary frequency response B(f) of the feedback path 220.1, wherein B(f) is chosen to have a generally high-pass characteristic. Note the frequency response B(f) for the feedback path 220 in FIG. 2B includes the effects of the filter 208 having frequency response H(f), and is shown for illustrative purposes only. The frequency response shown is not meant to limit the scope of the present disclosure to filters 208 having any particular frequency response characteristic.

Figure 2C:
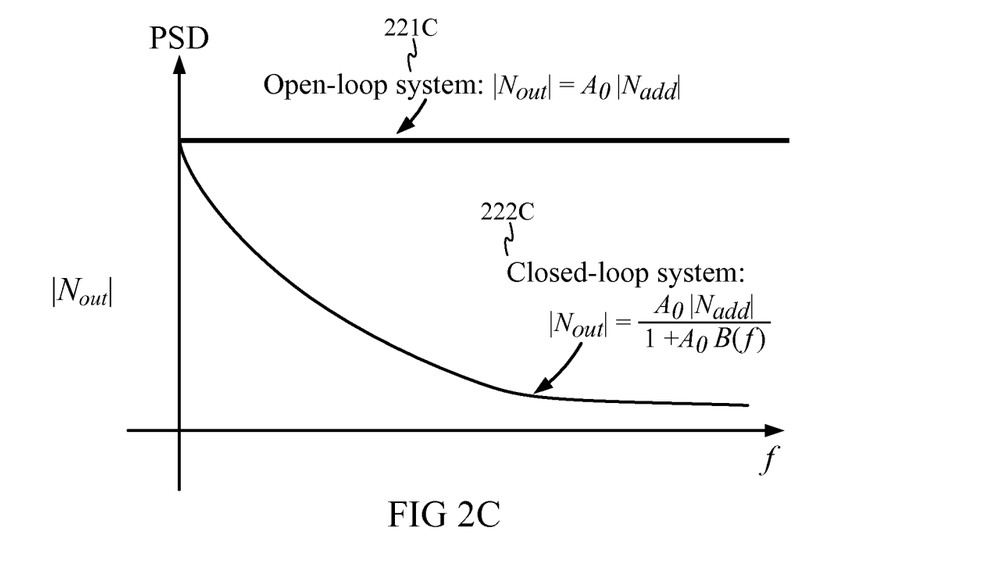
FIG. 2C illustrates the power spectral density (PSD) of $N_{out}$ versus frequency for the systems of the block diagrams shown in FIGS. 1A and 2A.

FIG. 2C illustrates the power spectral density (PSD) of $N_{out}$ versus frequency for the systems 100A and 200A, assuming the power spectral density of $N_{add}$ is approximately "white," i.e., constant over the frequency range of interest. One of ordinary skill in the art will appreciate, however, that the techniques of the present disclosure may be generally applied to noise $N_{add}$ having any profile versus frequency.

In FIG. 2C, a first characteristic 221C represents the power spectral density of $N_{out}$ in the open-loop system 100A, with the signal term $S_{in}$ set to zero, and the distortion term D omitted. The PSD of $N_{out}$ is seen to be simply $A_0|N_{add}|$.

In FIG. 2C, a second characteristic 222C represents the PSD of $N_{out}$ present in the closed-loop system 200A. The characteristic 222C is plotted according to the relationship describing $N_{out}$ given by Equation 2 above, further assuming the feedback path 220.1 has the specific frequency response shown in FIG. 2B. It can be seen that at frequencies above zero (DC), the power spectral density of $N_{out}$ in 222C is less than the corresponding power spectral density of $N_{out}$ in 221C. It will be appreciated that this is due to the high-pass filtering of $N_{out}$ performed by the feedback path 220.1, and subsequent subtraction of the high-pass filtered signal from the TX input by adder 202.

In light of the disclosure hereinabove, one of ordinary skill in the art will appreciate that by appropriately choosing the frequency response B(f), the transmitter 200 may effectively cancel out-of-band noise from the TX output 200a. In some cases, certain undesired components known as "close-in" interference or distortion may lie close to the desired signal in frequency, rendering it difficult or otherwise infeasible to select an appropriate frequency response B(f) to remove only the undesired components without disturbing the desired signal. For example, non-linear distortion in the TX signal may generate a type of undesired component known as "spectral re-growth," which may have significant power near the bandwidth (e.g., within three times the bandwidth) of the desired signal.

Figure 2D:
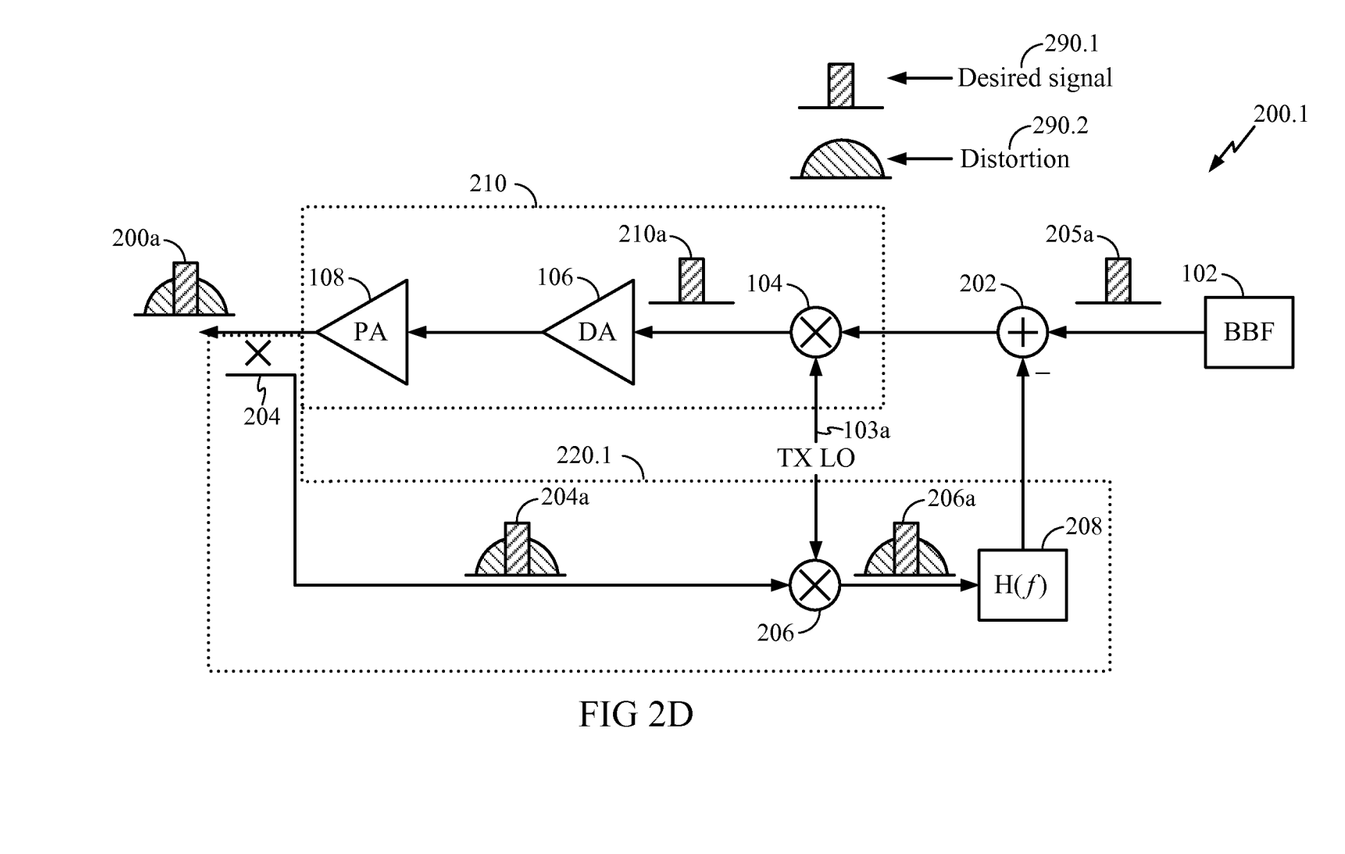
FIG. 2D illustrates the processing of sample spectra of a desired signal and close-in distortion that may be generated in the exemplary embodiment of the transmitter shown in FIG. 2.

FIG. 2D illustrates the processing of sample spectra 290.1 and 290.2 of a desired signal and close-in distortion, respectively, that may be generated in an exemplary embodiment 200.1 of the transmitter 200. In FIG. 2D, the spectrum 205a at the output of BBF 102 corresponds to the desired TX signal, without distortion. Before the TX output signal propagates through the feedback path 220.1, the shape of the spectrum 205a following the adder 202 and mixer 104 is preserved as 210a. The output of the mixer 104 is amplified by DA 106 and PA 108, whereupon distortion may be introduced to the desired signal. This distortion is depicted in the spectrum 200a at the output of the feed-forward path 210, shown as the superposition of a distortion spectrum 290.2 onto the desired signal spectrum 290.1.

The signal 200a is coupled to the mixer 206 via coupler 204 with a spectrum 204a. The mixer 206 performs down-conversion of the spectrum 204a to generate the spectrum 206a, which is in turn input to a filter 208. The output of filter 208 is subtracted from the output of BBF 102 by adder 202. Because the distortion spectrum 290.2 lies close to the desired signal spectrum 290.1 in frequency, it may be difficult to pick a characteristic H(f) for filter 208 that can effectively separate the two.

Figure 3:
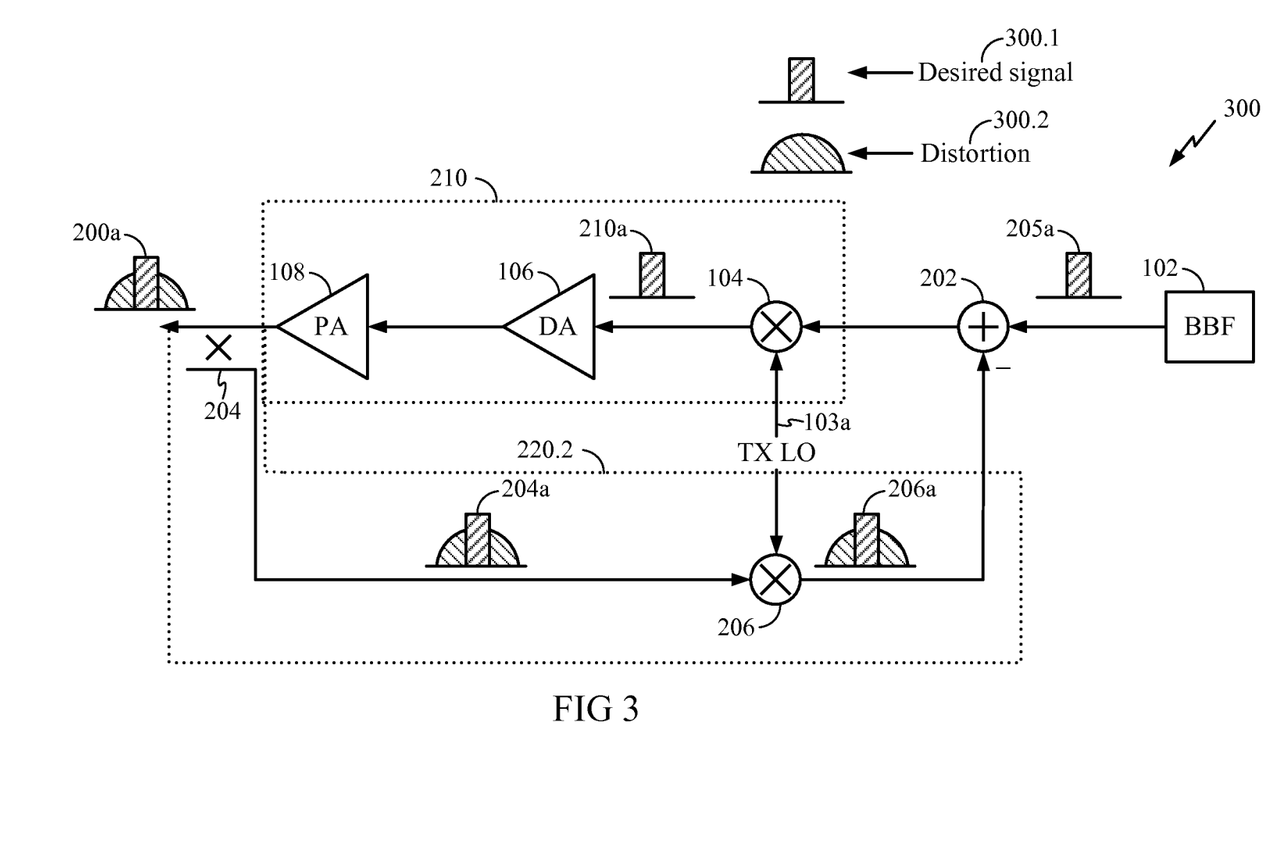
FIG. 3 illustrates the processing of sample spectra of a desired signal and close-in distortion that may be generated in a transmitter employing a technique known as "Cartesian feedback."

FIG. 3 illustrates the processing of sample spectra 300.1 and 300.2 of a desired signal and close-in distortion, respectively, that may be generated in a transmitter 300 employing a technique known as "Cartesian feedback." The transmitter 300 is similar to the transmitter 200.1 depicted in FIG. 2D, except that the feedback path 220.2 of the transmitter 300 is frequency independent and lacks, e.g., a filter 208 such as found in, e.g., the transmitter 200.1 of FIG. 2D.

Figure 3A:
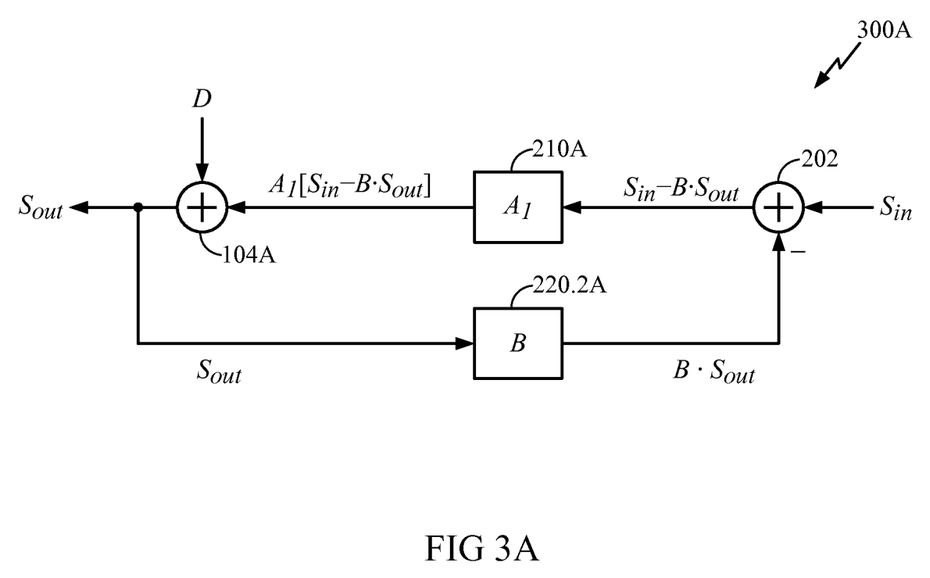
FIG. 3A illustrates a conceptualized block diagram of the effects of distortion on the transmitter shown in FIG. 3.

FIG. 3A illustrates a conceptualized block diagram 300A more clearly showing the effects of distortion on the transmitter 300 shown in FIG. 3. Note in FIG. 3A, the additive noise $N_{add}$ has been omitted for ease of illustration.

In FIG. 3A, the output signal $S_{out}$ is coupled to a feedback element 220.2A to generate the signal, $B \cdot S_{out}$, wherein B models the (frequency-independent) gain of the feedback path 220.2 in FIG. 3. $B \cdot S_{out}$ is coupled to the adder 202, which subtracts $B \cdot S_{out}$ from the desired signal $S_{in}$. $S_{in}$ may correspond, for example, to the output signal of the BBF 102 in FIG. 3. The output of adder 202 is represented as $S_{in} - B \cdot S_{out}$, and is input to a gain element 210A, which models the gain of the feed-forward path 210. The gain element 210A applies a gain $A_1$ to generate the signal $A_1 \cdot [S_{in} - B \cdot S_{out}]$. The output of the gain element 210A is combined with the distortion component D by adder 104A to generate $S_{out}$.

Given the above description, one of ordinary skill in the art will appreciate that the system 300A may be characterized as follows:

$$S_{out} = \frac{A_1 S_{in} + D}{1 + A_1 B}. \quad \text{(Equation 3)}$$

As seen from Equation 3, the gain $A_1$ $A_1$ applied to the signal $S_{in}$ $S_{in}$ is effectively reduced by a factor $(1+A_1 B)$ due to the feedback path 220.2. To keep the gain applied to $S_{in}$ equal to $A_0$, or the gain of the open-loop transmitter 100A, the gain $A_1$ of gain element 210A may be chosen as follows:

$$A_1 = \frac{A_0}{1 - A_0 B}; \quad \text{(Equation 4)}$$

wherein $A_0$ corresponds to the gain of the feed-forward path 210 of the open-loop transmitter 100A, and the feedback gain B is chosen such that $(1-A_0 B) \ll 1$. The system 300A may then be characterized as follows:

$$S_{out} = A_0 S_{in} + D(1 - A_0 B). \quad \text{(Equation 5)}$$

From a comparison of Equation 5 with Equation 1, it will be appreciated that by using Cartesian feedback, the level of distortion D in Equation 5 is reduced by a factor of $(1-A_0 B)$ relative to Equation 1, while the gain applied to the input signal $S_{in}$ is kept constant at $A_0$. This is accomplished, however, at the cost of increasing the forward gain $A_1$ of the closed-loop transmitter of 300A by a factor $$\frac{1}{1 - A_0 B}$$

over the corresponding gain $A_0$ of the open-loop transmitter 100A, as seen from Equation 4.

Figure 4:
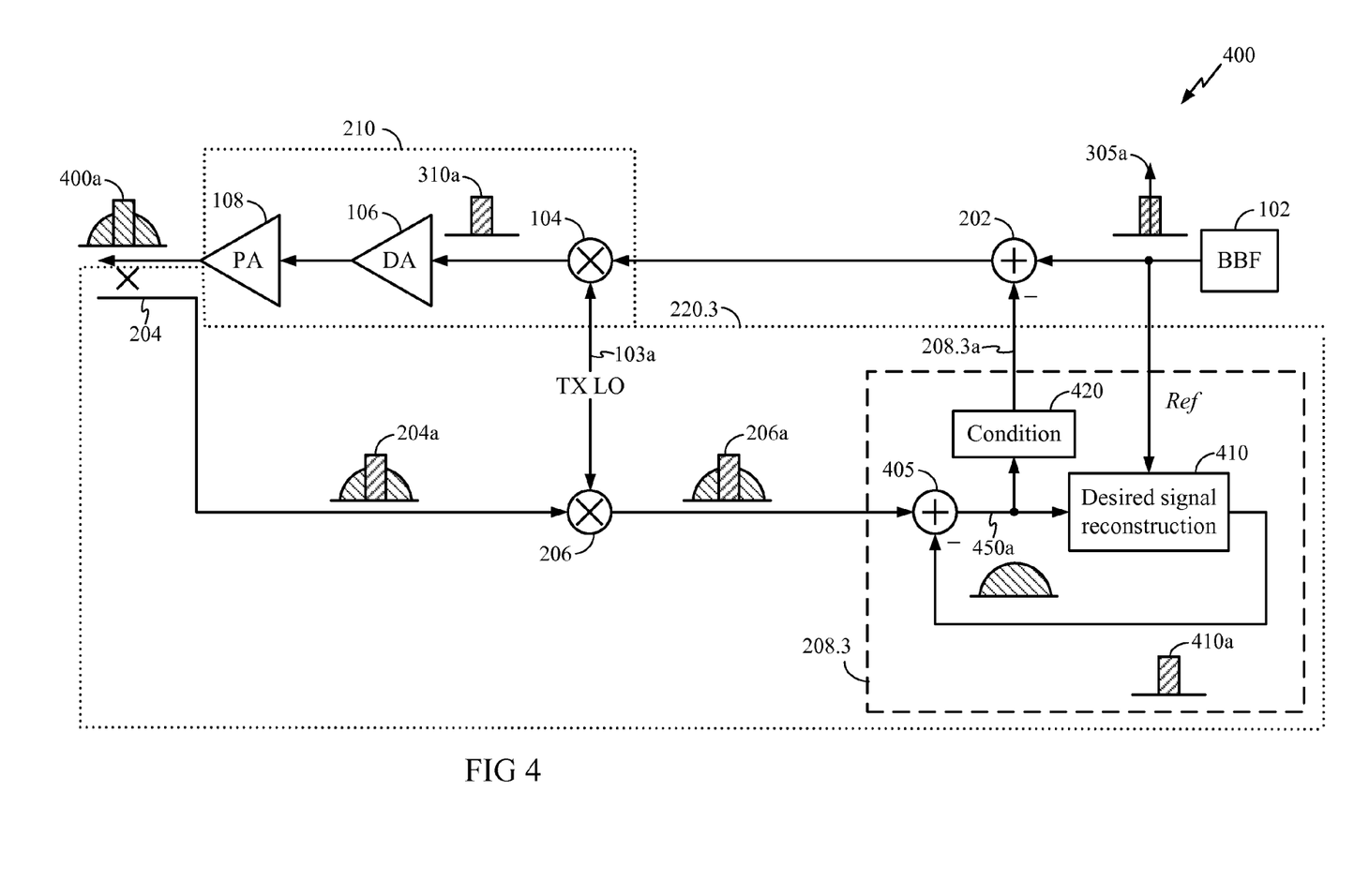
FIG. 4 illustrates an alternative exemplary embodiment of a transmitter according to the present disclosure.

FIG. 4 illustrates an alternative exemplary embodiment of a transmitter 400 according to the present disclosure. Note similarly labeled elements in FIGS. 2 and 4 may generally perform similar functions unless otherwise noted. In FIG. 4, the exemplary embodiment 400 includes a feed-forward path 210 and a feedback path 220.3 with elements as shown.

In FIG. 4, the output signal 400a of the transmitter 400 is provided to the mixer 206 via the coupler 204 as signal 204a. The mixer 206 down-converts the signal 204a to baseband to generate the signal 206a, and the signal 206a is subsequently input to an interference reconstruction block 208.3. The block 208.3 includes an adder 405, a desired signal reconstruction block 410, and a signal conditioning block 420, whose operation will be further described hereinbelow.

The desired signal reconstruction block 410 is configured to reconstruct an estimate 410a of the desired signal present in the output signal $S_{out}$. In an exemplary embodiment, the desired signal reconstruction block 410 may be provided with a reference signal Ref derived from, e.g., the output of BBF 102, or from any other signal deemed suitable for use as a reference signal. The reconstructed estimate 410a is subsequently subtracted from the signal 206a by adder 405. Assuming reasonably accurate reconstruction by block 410 of the desired signal, the residual signal 450a output by adder 405 is expected to be composed mainly of the undesired interference component present in the signal 206a. In FIG. 4, this is shown by the lack of a desired signal in the spectrum of 450a. The residual signal 450a is input to the signal conditioning block 420, which may be configured to condition the amplitude, phase, and/or timing of the signal 450a to generate a reconstructed interference signal 208.3a. The signal 208.3a is subtracted from the output of BBF 102 by adder 202.

Figure 4A:
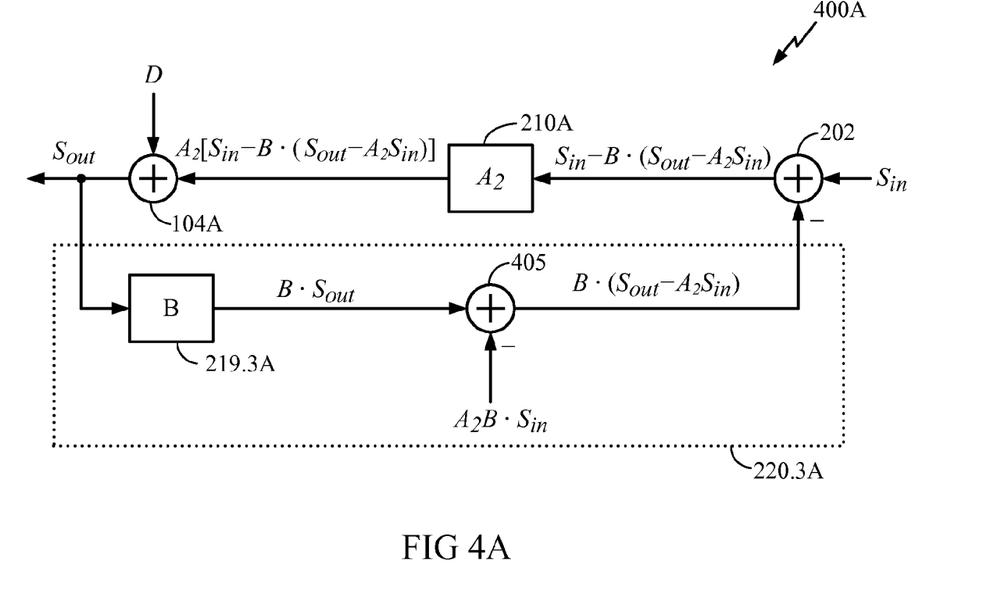
FIG. 4A illustrates a conceptualized block diagram of the operations performed by the transmitter shown in FIG. 4.

FIG. 4A illustrates a conceptualized block diagram 400A of the operations performed by the transmitter 400 shown in FIG. 4. In FIG. 4A, the output signal $S_{out}$ is coupled to the feedback element 220.3A, which models the feedback path 220.3 of the transmitter 400. The feedback element 220.3A includes an element 219.3A, which may model, e.g., the gain of the combination of coupler 204 and mixer 206. The output of the element 219.3A, also expressed as $B \cdot S_{out}$, is coupled to the adder 405. The input to the adder 405 is expressed as $A_2 B \cdot S_{in}$, wherein $A_2$ corresponds to the gain in the feed-forward path 210 of the transmitter 400. As earlier described with reference to block 410, the signal $A_2 B \cdot S_{in}$ is an estimate of the contribution of the desired signal to the TX output signal $S_{out}$, and may correspond, e.g., to the output 410a of the desired signal reconstruction block 410 in FIG. 4.

The output of adder 405 is expressed as $B \cdot (S_{out} - A_2 S_{in})$, and is further subtracted from the desired signal $S_{in}$ by adder 202. The output of adder 202, which is expressed as $S_{in} - B \cdot (S_{out} - A_2 S_{in})$, is further multiplied by the gain $A_2$ of the feed-forward element 210A, and coupled to a distortion component D by adder 104A to generate $S_{out}$.

Given the above description, the system 400A may be characterized as follows:

$$S_{out} = A_2 S_{in} + \frac{D}{1 + A_2 B}. \quad \text{(Equation 6)}$$

In an exemplary embodiment, the gain $A_2$ of the feed-forward element 210A may be set equal to the gain $A_0$ of the open-loop transmitter 100A, so that Equation 6 may be rewritten as follows:

$$S_{out} = A_0 S_{in} + \frac{D}{1 + A_0 B}. \quad \text{(Equation 7)}$$

Based on Equation 7, it will be appreciated that in the transmitter 400, the distortion D may be advantageously reduced by the factor $(1+A_0 B)$, while the gain $A_0$ applied to the input signal $S_{in}$ in the feed-forward path need not be increased above that applied in the open-loop transmitter 100A.

Figure 5:
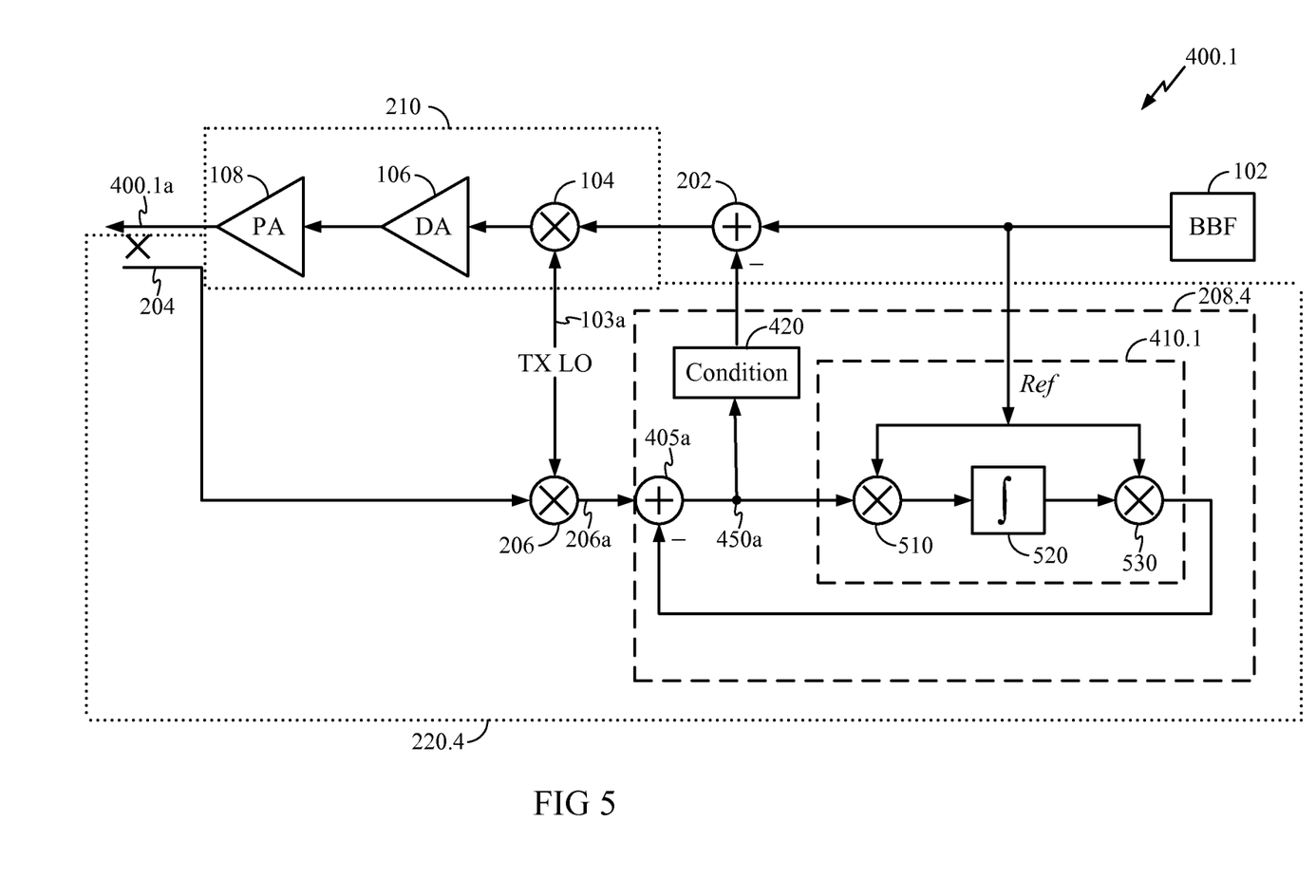
FIG. 5 illustrates an exemplary embodiment of the transmitter shown in FIG. 4, including an exemplary embodiment of a desired signal reconstruction block.

FIG. 5 illustrates an exemplary embodiment 400.1 of the transmitter 400 in FIG. 4, including an exemplary embodiment 410.1 of a desired signal reconstruction block 410. Note the embodiment 410.1 is shown for illustrative purposes only, and is not meant to limit the scope of the present disclosure to any particular embodiment of a desired signal reconstruction block 410. In FIG. 5, the transmitter 400.1 includes a feed-forward path 210 and a feedback path 220.4.

In the desired signal reconstruction block 410.1, a multiplier 510 and an integrator 520 are configured to correlate the signal 450a with a reference signal Ref. In an exemplary embodiment, the reference signal Ref may be derived from the output of BBF 102, or it may be derived from any other signal deemed suitable for use as a reference signal. The multiplier 510 may also be implemented as a mixer with the reference signal Ref applied to the LO port. In an exemplary embodiment, the integrator 520 may be implemented as a low-pass filter. The desired output signal of the integrator 520 is a DC signal related to the product of the gain of the feed-forward path and the gain of the feedback path. This signal and the reference signal Ref are fed to the second multiplier 530, whose output should ideally be an exact replica of the desired signal in the feedback signal 206a. This reconstructed replica of the desired signal is subtracted from 206a by the adder 405a. The output signal 450a of the adder 405a includes interference components such as distortion and noise. These interference components are passed to the signal conditioning block 420 and further subtracted from the baseband TX signal by the adder 202.

One of ordinary skill in the art will appreciate that in an exemplary embodiment wherein the TX output signal 400.1a is complex, i.e., includes in-phase and quadrature components, the reference signal Ref input to the multiplier 510 may be derived from the complex conjugate of the baseband TX signal. Such exemplary embodiments are contemplated to be within the scope of the present disclosure.

One of ordinary skill in the art will further appreciate that the techniques disclosed herein may be implemented entirely in the analog domain, or partially in the analog domain and partially in the digital domain by using analog-to-digital converters (ADC's) and digital-to-analog converters (DAC's) where appropriate. For example, in an exemplary embodiment of the transmitter 400 shown in FIG. 4, an ADC may be provided following the mixer 206, the reference signal Ref may be a digital version provided from digital baseband TX processing circuitry (not shown), and the operations performed by the interference reconstruction blocks 208.3 and 208.4 may be performed entirely in the digital domain. In such an exemplary embodiment, the output of the interference reconstruction block 208.3 and 208.4, or the output of the block 420 may be converted back to the analog domain using a DAC to facilitate further processing. Such exemplary embodiments are contemplated to be within the scope of the present disclosure.

Figure 6:
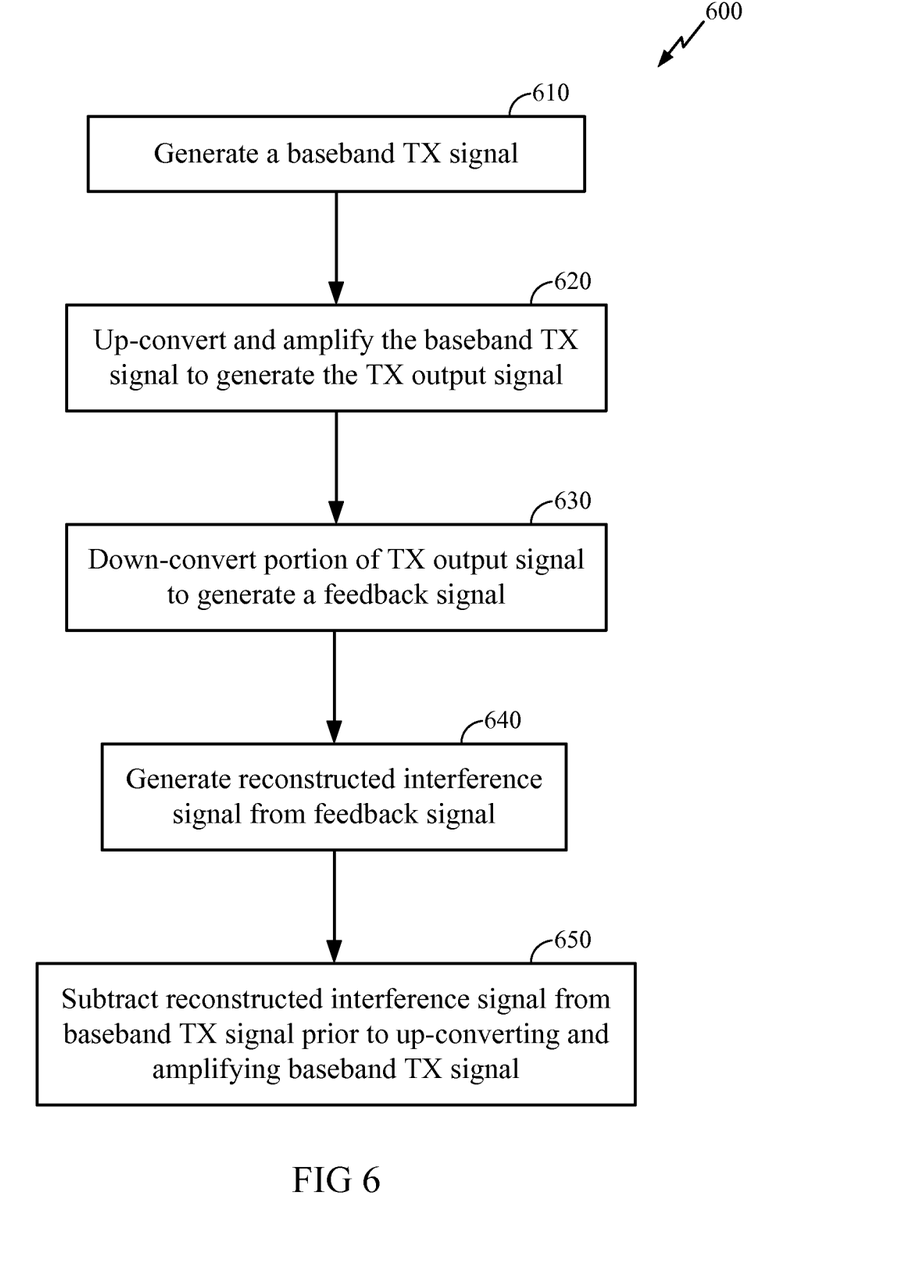
FIGS. 6 and 6A illustrate exemplary embodiments of a method according to the present disclosure.
Figure 6A:
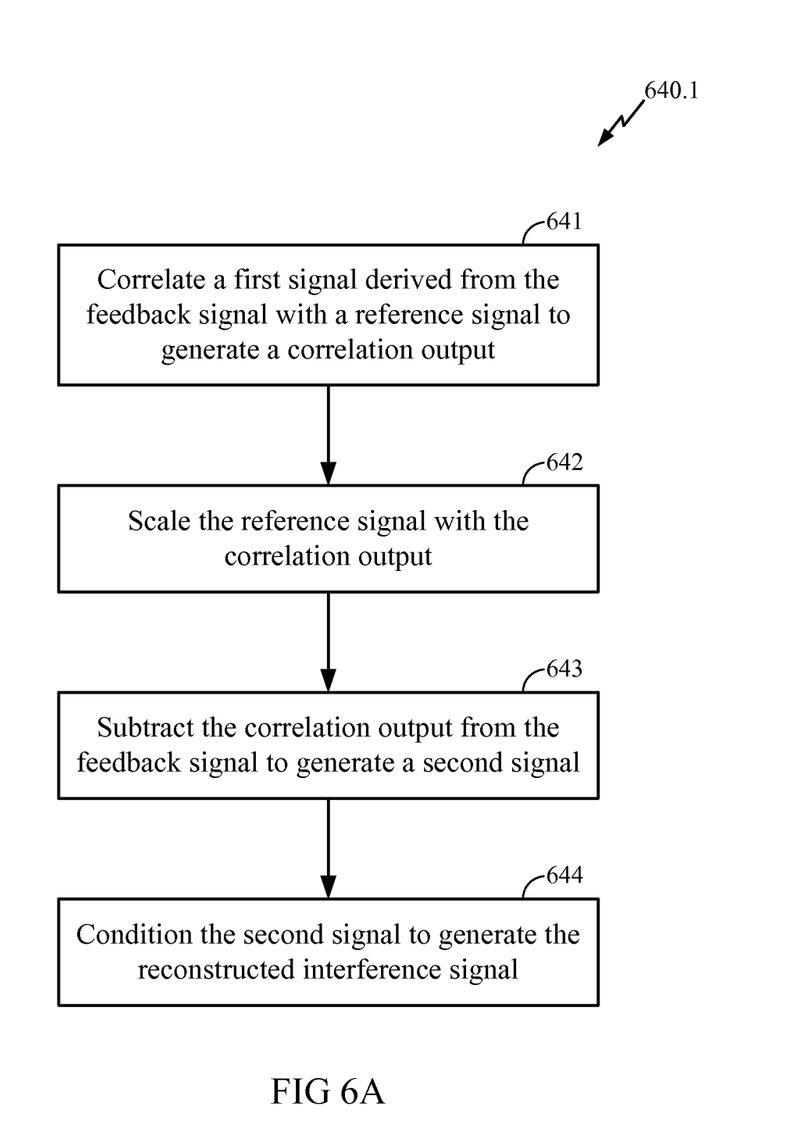

FIGS. 6 and 6A illustrate exemplary embodiments of a method 600 according to the present disclosure. Note the methods are shown for illustrative purposes only, and are not meant to limit the scope of the present disclosure to any particular exemplary embodiment of a method illustrated.

In FIG. 6, at block 610, a baseband TX signal is generated.

At block 620, the baseband TX signal is up-converted and amplified to generate the TX output signal.

At block 630, a portion of the TX output signal is down-converted to generate a feedback signal.

At block 640, a reconstructed interference signal is generated from the feedback signal.

At block 650, the reconstructed interference signal is subtracted from the baseband TX signal prior to up-converting and amplifying the baseband TX signal.

FIG. 6A illustrates an exemplary embodiment 640.1 of operations performed at block 640 of the method 600.

At block 641, a first signal derived from the feedback signal is correlated with a reference signal to generate a correlation output.

At block 642, the reference signal is scaled with the correlation output.

At block 643, the correlation output is subtracted from the feedback signal to generate a second signal.

At block 644, the second signal is conditioned to generate the reconstructed interference signal. In an exemplary embodiment, the conditioning may include providing a certain amplitude, phase and/or delay to the second signal to generate the reconstructed interference signal.

One of ordinary skill in the art will appreciate that in alternative exemplary embodiments (not shown), other techniques may be applied to estimate and subtract the contribution of the desired signal to the term $S_{out}$. Such alternative exemplary embodiments are contemplated to be within the scope of the present disclosure.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other exemplary embodiments without departing from the spirit or scope of the invention. Thus, the present invention is not intended to be limited to the exemplary embodiments shown herein but is to be accorded the widest scope consistent with the principles and novel features disclosed herein.

The invention claimed is:

1. A method for generating a transmit (TX) output signal in a communications transmitter, the method comprising:

generating a baseband TX signal;

up-converting and amplifying the baseband TX signal to generate the TX output signal;

down-converting a portion of the TX output signal to generate a feedback signal;

generating a reconstructed interference signal from the feedback signal; and subtracting the reconstructed interference signal from the baseband TX signal prior to up-converting and amplifying the baseband TX signal;

the generating the reconstructed interference signal comprising:

correlating a first signal derived from the feedback signal with a reference signal comprising the baseband TX signal to generate a correlation output, wherein the correlating comprises multiplying the first signal with the complex conjugate of the reference signal, and integrating the result of the multiplying; and processing the reference signal and the correlation output to generate the reconstructed interference signal.

2. The method of claim 1, the generating the reconstructed interference signal comprising high-pass filtering the feedback signal.

3. The method of claim 2, the high-pass filtering the feedback signal comprising digitizing the feedback signal and filtering the digitized feedback signal in the digital domain.

4. The method of claim 1, the amplifying the baseband TX signal comprising using a driver amplifier coupled to a power amplifier.

5. The method of claim 1, the up-converting comprising mixing with a TX local oscillator (LO), the down-converting comprising mixing with the same TX LO.

6. The method of claim 5, the down-converting further comprising low-pass filtering the output of the down-converting.

7. The method of claim 1, the processing the reference signal and the correlation output comprising:

scaling the reference signal with the correlation output;

subtracting the scaled correlation output from the feedback signal to generate a second signal; and conditioning the second signal to generate the reconstructed interference signal.

8. The method of claim 7, the conditioning the second signal comprising adjusting the amplitude of the second signal.

9. The method of claim 7, the conditioning the second signal comprising adjusting the phase of the second signal.

10. The method of claim 7, the conditioning comprising aligning the second signal in time.

11. The method of claim 7, the scaling the reference signal with the correlation output comprising multiplying the correlation output with the reference signal.

12. The method of claim 7, the second signal being equal to the first signal.

13. The method of claim 1, wherein the first signal comprises the feedback signal minus the result of the integrating.

14. An apparatus for generating a transmit (TX) output signal in a communications transmitter, the apparatus comprising:

a feed-forward path configured to generate the TX output signal from a baseband TX signal;

a feedback path comprising:

a coupler for coupling a portion of the TX output signal for down-conversion;

a down-converter for down-converting the coupler output to generate a feedback signal; and an interference reconstruction block for generating a reconstructed interference signal from the feedback signal, the interference reconstruction block further comprising:
a correlator configured to correlate a first signal derived from the feedback signal with a reference signal comprising the baseband TX signal by multiplying the first signal with the complex conjugate of the reference signal and integrating the result of the multiplying; the apparatus further comprising:
a subtractor for subtracting the reconstructed interference signal from the baseband TX signal prior to the feed-forward path.

15. The apparatus of claim 14, the interference reconstruction block comprising a high-pass filter.

16. The apparatus of claim 14, the feedback path further comprising a low-pass filter coupling the output of the down-converter to the feedback signal.

17. The apparatus of claim 14, the correlator comprising:
a first multiplier configured to multiply a first signal derived from the feedback signal with a reference signal;
an integrator configured to integrate the output of the first multiplier; the interference reconstruction block further comprising:
a second multiplier configured to multiply the integrator output with a complex conjugate of the reference signal; and
a conditioner configured to condition the first signal to generate the reconstructed interference signal.

18. The apparatus of claim 17, the first signal comprising the difference between the feedback signal and the output of the second multiplier.

19. The apparatus of claim 14, wherein the first signal comprises the feedback signal minus the result of the integrating.

20. An apparatus for generating a transmit (TX) output signal in a communications transmitter, the apparatus comprising:
means for generating a baseband TX signal;
means for up-converting and amplifying the baseband TX signal to generate the TX output signal;
means for down-converting a portion of the TX output signal to generate a feedback signal;
means for generating a reconstructed interference signal from the feedback signal; and
means for subtracting the reconstructed interference signal from the baseband TX signal prior to up-converting and amplifying the baseband TX signal;
the means for generating comprising:
means for correlating a first signal derived from the feedback signal with a reference signal comprising the baseband TX signal to generate a correlation output, wherein the correlating comprises multiplying the first signal with the complex conjugate of the reference signal, and integrating the result of the multiplying.

21. The apparatus of claim 20, the means for generating a reconstructed interference signal further comprising a means for high-pass filtering.

22. The apparatus of claim 20, the means for generating a reconstructed interference signal further comprising a means for subtracting out a desired signal from the feedback signal.

23. A non-transitory computer-readable storage medium storing code for causing a computer to generate a baseband TX signal in a communications transmitter, the communications transmitter comprising a feed-forward path configured to generate a TX output signal from the baseband TX signal, the communications transmitter further comprising a feedback path comprising a coupler for coupling a portion of the TX output signal for down-conversion and a down-converter for down-converting the coupler output to generate a feedback signal; the code comprising:
code for causing a computer to generate a reconstructed interference signal from the feedback signal; and
code for causing a computer to subtract the reconstructed interference signal from the baseband TX signal prior to the feed-forward path;
the code for causing the computer to generate comprising:
code for causing a computer to correlate a first signal derived from the feedback signal with a reference signal comprising the baseband TX signal to generate a correlation output by multiplying the first signal with the complex conjugate of the reference signal, and integrating the result of the multiplying.

* * * * *